United States Patent
Choi

(10) Patent No.: US 9,932,020 B2
(45) Date of Patent: Apr. 3, 2018

(54) AUTOMATIC STOPPING DEVICE FOR FORKLIFT

(71) Applicant: Doosan Corporation, Seoul (KR)

(72) Inventor: Ui Gon Choi, Seoul (KR)

(73) Assignee: Doosan Corporation, Seoul (KR)

( * ) Notice: Subject to any disclaimer, the term of this patent is extended or adjusted under 35 U.S.C. 154(b) by 148 days.

(21) Appl. No.: 14/650,736

(22) PCT Filed: Oct. 14, 2013

(86) PCT No.: PCT/KR2013/009144
§ 371 (c)(1),
(2) Date: Jun. 9, 2015

(87) PCT Pub. No.: WO2014/092321
PCT Pub. Date: Jun. 19, 2014

(65) Prior Publication Data
US 2015/0315001 A1 Nov. 5, 2015

(30) Foreign Application Priority Data
Dec. 10, 2012 (KR) .................. 10-2012-0142751

(51) Int. Cl.
*B60T 7/14* (2006.01)
*B60T 7/04* (2006.01)
(Continued)

(52) U.S. Cl.
CPC ............. *B60T 7/042* (2013.01); *B60T 7/14* (2013.01); *B60T 13/662* (2013.01);
(Continued)

(58) Field of Classification Search
CPC ... B60T 7/12; B60T 7/14; B60T 7/042; B60T 13/662; B60T 13/68; B66F 9/07504; B66F 9/07509; B66F 17/00; B66F 17/003
See application file for complete search history.

(56) References Cited

U.S. PATENT DOCUMENTS 4,629,043 A * 12/1986 Matsuo .................. B60T 7/107
188/2 D
5,109,945 A 5/1992 Koga
(Continued)

FOREIGN PATENT DOCUMENTS

CN 101229808 A 7/2008
EP 0059588 A1 9/1982
(Continued)

OTHER PUBLICATIONS

Chinese Office Action dated May 3, 2016 for Chinese Application No. 201380064505.8, 5 pages.
(Continued)

*Primary Examiner* — Barry Gooden, Jr.
(74) *Attorney, Agent, or Firm* — John D. Veldhuis-Kroeze; Westman, Champlin & Koehler, P.A.

(57) ABSTRACT

An exemplary embodiment of the present disclosure relates to an automatic stopping device for a forklift, and more particularly, to an automatic stopping device for a forklift, which forcibly stops the forklift by simultaneously operating a forward clutch and a reverse clutch when an operator moves away from the forklift in a state in which an engine is turned on. According to the automatic stopping device for a forklift according to the exemplary embodiment of the present disclosure, first, it is possible to prevent a safety accident by forcibly stopping the forklift in the absence of the operator, and second, the automatic stopping device for a forklift is economical because it is possible to effectively stop the forklift using an additional simple configuration.

5 Claims, 3 Drawing Sheets

(51) Int. Cl.
*B66F 9/075* (2006.01)
*B66F 17/00* (2006.01)
*B60T 13/66* (2006.01)

(52) U.S. Cl.
CPC ...... *B66F 9/07504* (2013.01); *B66F 9/07509* (2013.01); *B66F 17/003* (2013.01)

(56) References Cited

U.S. PATENT DOCUMENTS

| | | | | |
|---|---|---|---|---|
| 5,340,202 | A * | 8/1994 | Day | B60L 3/02 303/19 |
| 6,246,313 | B1 * | 6/2001 | Baker | B60K 31/0008 340/425.5 |
| 8,997,477 | B2 * | 4/2015 | Heo | B66F 9/22 60/428 |
| 9,381,895 | B1 * | 7/2016 | Smathers | B60T 7/12 |
| 9,440,833 | B2 * | 9/2016 | Kaneko | B66F 9/24 |
| 2006/0064224 | A1 * | 3/2006 | Li | B60T 7/14 701/70 |
| 2008/0201044 | A1 * | 8/2008 | Yamada | B60K 28/04 701/50 |
| 2012/0018240 | A1 * | 1/2012 | Grubaugh | B60T 7/14 180/273 |
| 2012/0191313 | A1 * | 7/2012 | Miyahara | B60K 28/14 701/70 |
| 2014/0172240 | A1 * | 6/2014 | Schemmel | B60T 17/18 701/49 |
| 2014/0365062 | A1 * | 12/2014 | Urhahne | B60W 50/16 701/23 |
| 2014/0367187 | A1 * | 12/2014 | Kodaka | E02F 9/2253 180/338 |
| 2016/0121861 | A1 * | 5/2016 | Korte | B60T 7/12 701/70 |

FOREIGN PATENT DOCUMENTS

| | | |
|---|---|---|
| EP | 1108632 A2 | 6/2001 |
| EP | 1721774 A1 | 11/2006 |
| EP | 1950171 A2 | 7/2008 |
| EP | 2495145 A1 | 9/2012 |
| JP | H06-042494 U | 6/1994 |
| JP | H07228227 A | 8/1995 |
| JP | H08-159177 A | 6/1996 |
| KR | 10-2000-0075328 A | 12/2000 |
| KR | 10-2003-0090160 A | 11/2003 |
| KR | 10-2007-0064920 A | 6/2007 |

OTHER PUBLICATIONS

International Search Report with English translation from the Korean Intellectual Property Office dated Jan. 21, 2014 for corresponding Korean Application No. PCT/KR2013/009144, filed Oct. 14, 2013.
European Search Report dated Nov. 22, 2016 for European Application No. 13863165.0, 5 pages.

* cited by examiner

AUTOMATIC STOPPING DEVICE FOR FORKLIFT

CROSS-REFERENCE TO RELATED APPLICATION

This Application is a Section 371 National Stage Application of International Application No. PCT/KR2013/009144, filed Oct. 14, 2013 and published, not in English as WO 2014/092321 A1.

FIELD OF THE DISCLOSURE

An exemplary embodiment of the present disclosure relates to an automatic stopping device for a forklift, and more particularly, to an automatic stopping device for a forklift, which forcibly stops the forklift by simultaneously operating a forward clutch and a reverse clutch when an operator moves away from the forklift in a state in which an engine is turned on.

BACKGROUND OF THE DISCLOSURE

In general, a forklift is used to lift up a heavy object and carry the object to a location desired by an operator and widely utilized in many industries. In the case of the forklift, a driving speed of the forklift is increased by adjusting a rotational speed of an engine depending on a degree to which an accelerator pedal is manipulated.

In view of working properties of the forklift, the forklift mainly serves to carry a heavy object while moving a short distance at a low speed after lifting up the object rather than moving a long distance or moving at a high speed. Therefore, in order for the forklift to be stopped after traveling, the forklift may only be stopped when a speed is decreased due to frictional force between the ground surface and wheels of the forklift while the forklift coasts even though an accelerator pedal is not pressed while the forklift travels. However, because a degree at which a speed is decreased while the forklift coasts is small, the forklift may be quickly stopped by using an additional device such as a service brake or a retarder.

In addition, when the operator stops the forklift to lift up an object, the operator forcibly stops the forklift using stopping devices such as a traveling stopping device and a parking stopping device in order to prevent the forklift from being moved forward and rearward.

However, both of the traveling stopping device and the parking stopping device operate a brake device using hydraulic, electrical or mechanical force as the operator directly manipulates a pedal, a button, or a lever, in order to forcibly inhibit the forklift from being moved.

Therefore, although the operator often moves away from an operator's seat in a state in which the operator turns on the engine in view of working properties of the forklift, the traveling stopping device and the parking stopping device cannot be operated in the absence of the operator. Accordingly, in the absence of the operator, the forklift may inadvertently move forward or rearward, which may cause a higher risk in view of a safety accident.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

According to an exemplary embodiment of the present disclosure, when an operator moves away from an operator's seat in a state in which an engine of a forklift is turned on, the forklift may be forcibly stopped by automatically operating both a forward clutch and a reverse clutch.

In order to achieve the above object, an automatic stopping device for a forklift according to an exemplary embodiment of the present disclosure includes: a forward/reverse lever (50) of the forklift which is manipulated by an operator; a forward actuation valve (42) and a reverse actuation valve (46) which are operated by the forward/reverse lever (50); a transmission (40) which is provided between an engine (11) and drive wheels (10) and performs a gear shift operation by an operation of the forward actuation valve (42) or the reverse actuation valve (46); and a stopping unit which forcibly stops the forklift depending on whether the operator is present, in which the stopping unit includes: a seated operator detecting means (60) which detects whether the operator is seated in an operator's seat; a brake pedal detecting means (70) which detects whether a brake pedal is operated; and a controller (80) which obtains signals from the seated operator detecting means (60) and the brake pedal detecting means (70) and controls the forward actuation valve (42) and the reverse actuation valve (46).

In addition, the seated operator detecting means (60) may be provided as a pressure sensor mounted in the operator's seat.

In addition, the controller (80) may compare the signals received from the seated operator detecting means (60) and the brake pedal detecting means (70) with respective predetermined values, and may operate the forward actuation valve (42) or the reverse actuation valve (46) of the transmission (40) depending on the compared information.

In addition, the brake pedal detecting means (70) may detect an electrical contact of the brake pedal or may detect an operating angle of the brake pedal.

In addition, in the automatic stopping device for a forklift, when a predetermined time has passed after the seated operator detecting means (60) detects the absence of the operator, both of the forward actuation valve (42) and the reverse actuation valve (46) may be operated.

In addition, in the automatic stopping device for a forklift, when the brake pedal detecting means (70) detects the operation of the brake pedal, all signals transmitted from the controller (80) to the forward actuation valve (42) and the reverse actuation valve (46) may be released.

According to the automatic stopping device for a forklift according to the exemplary embodiment of the present disclosure, first, it is possible to prevent a safety accident by forcibly stopping the forklift in the absence of the operator, and second, the automatic stopping device for a forklift is economical because it is possible to effectively stop the forklift using an additional simple configuration.

DESCRIPTION OF MAIN REFERENCE NUMERALS OF THE DRAWINGS

Figure 1:
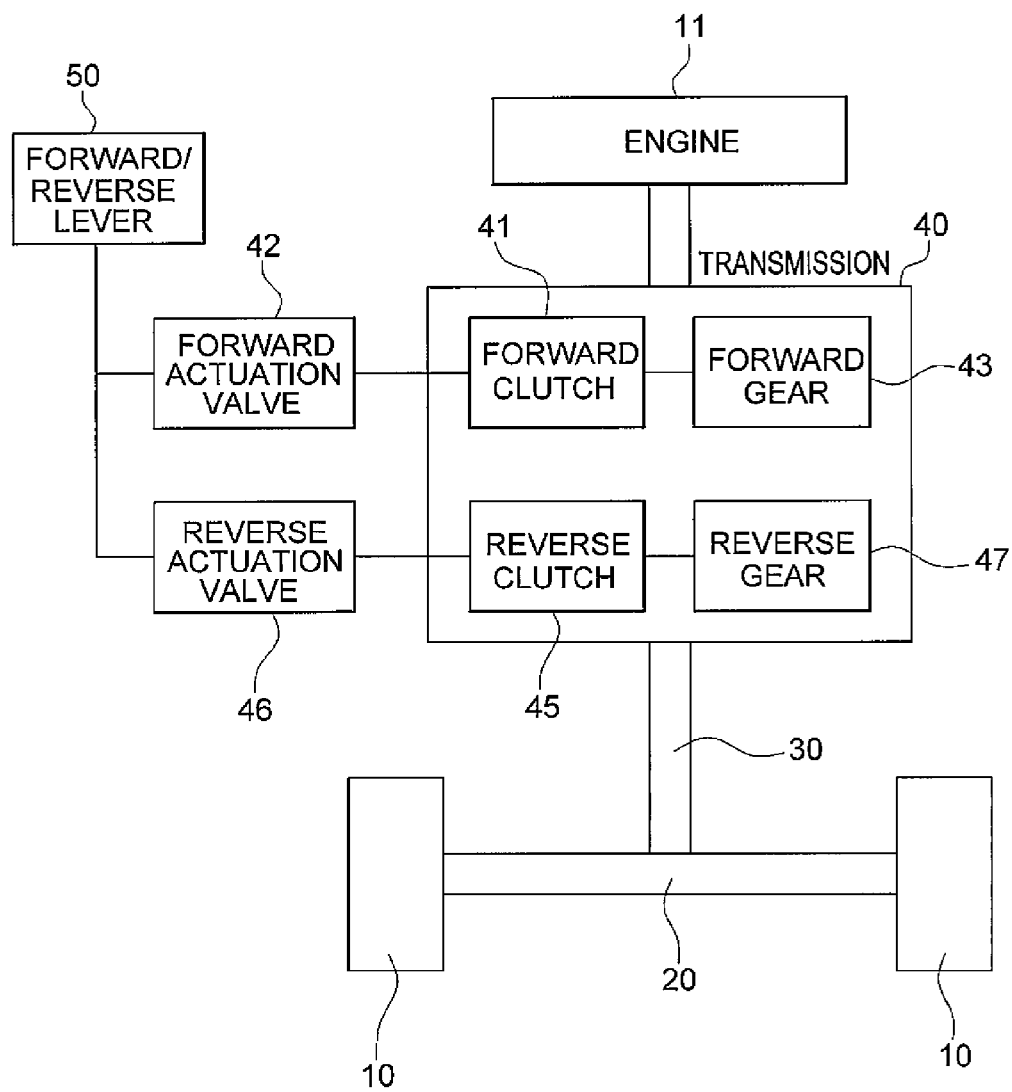
FIG. 1 is a block diagram regarding a configuration of a forklift system in the related art.

10: Drive wheel
11: Engine
20: Drive wheel axle
30: Drive shaft
40: Transmission
41: Forward clutch
42: Forward actuation valve
43: Forward gear
45: Reverse clutch
46: Reverse actuation valve
47: Reverse gear
50: Forward/reverse lever
60: Seated operator detecting means
70: Brake pedal detecting means
80: Controller

DETAILED DESCRIPTION

Hereinafter, an automatic stopping device for a forklift according to an exemplary embodiment of the present disclosure will be described in detail with reference to the accompanying drawings so that those skilled in the art to which the present disclosure pertains may easily carry out the exemplary embodiment. The present disclosure is not limited to the exemplary embodiments described herein, and may be embodied in various different forms. A part irrelevant to the description will be omitted to clearly describe the present disclosure, and the same or similar constituent elements will be designated by the same reference numerals throughout the specification.

FIG. 1 is an explanatory view of a configuration regarding a forklift system in the related art. The forklift has a hydraulic pump (not illustrated) which is driven by an engine 11, and the forklift has a configuration in which hydraulic oil discharged from the hydraulic pump is transferred to various types of working machines while passing through a main hydraulic line.

In addition, an engine type forklift transmits power generated by the engine 11 to drive wheels 10, a drive shaft 30, and an axle 20, and a transmission 40 is provided between the engine 11 and the drive wheels 10.

Figure 2:
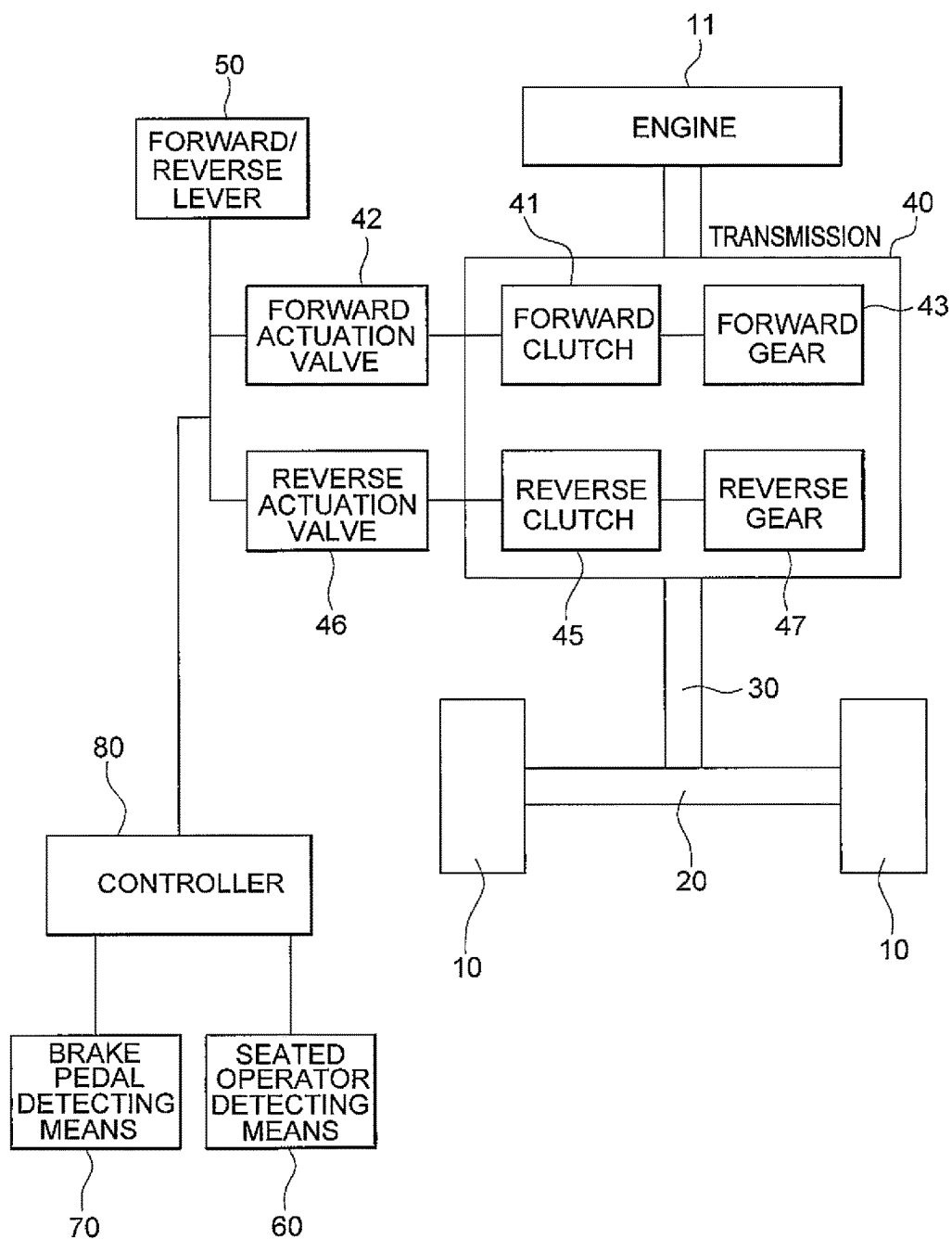
FIG. 2 is a block diagram regarding a configuration of a forklift system according to an exemplary embodiment of the present disclosure.
Figure 3:
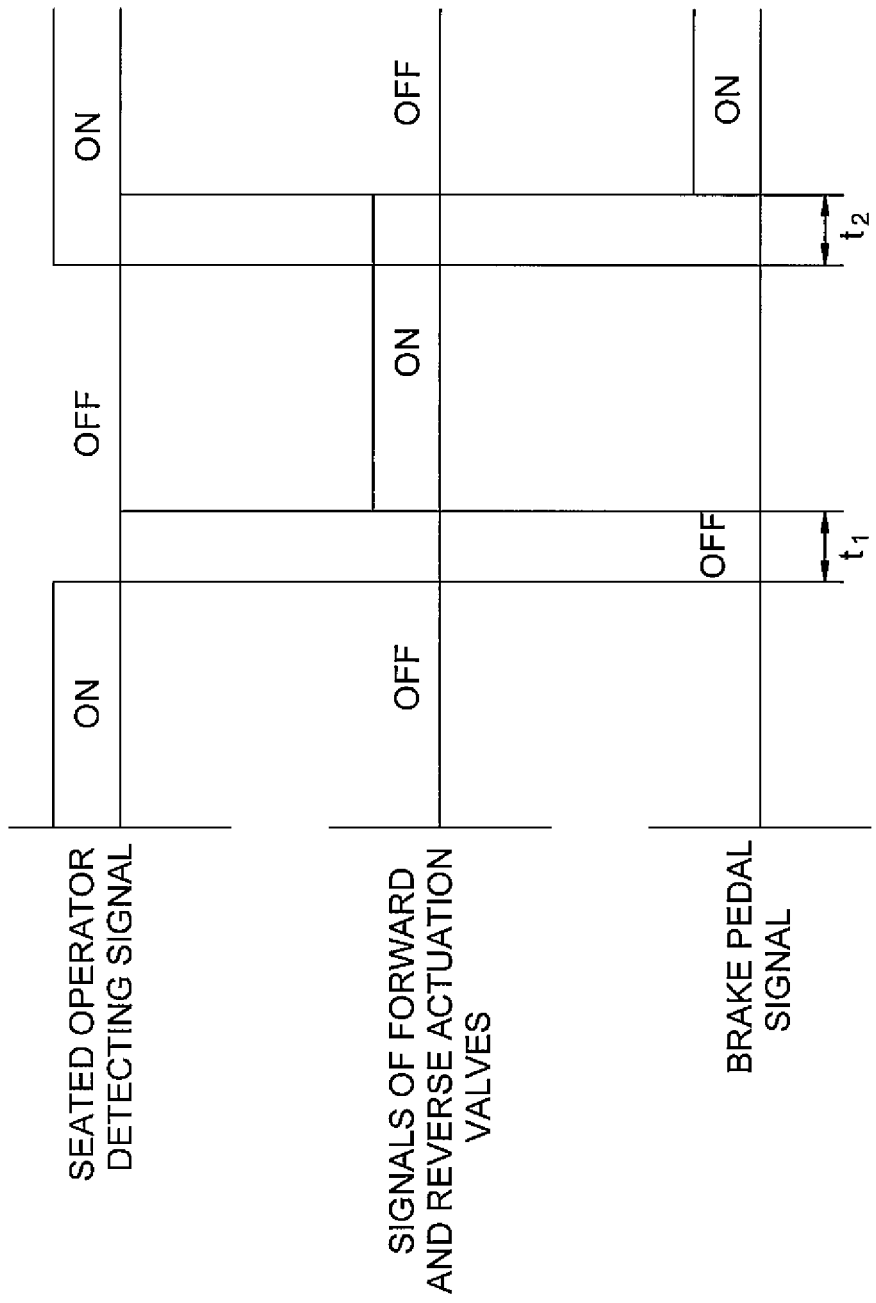
FIG. 3 is an explanatory view regarding an algorithm of an automatic stopping device according to the exemplary embodiment of the present disclosure.

FIG. 2 is an explanatory view regarding a configuration of a forklift system according to an exemplary embodiment of the present disclosure. As illustrated in FIG. 2, in a forklift according to the exemplary embodiment of the present disclosure, power generated by the engine 11 is transmitted to the transmission 40 such that a gear shift operation is carried out so that the forklift moves forward or rearward. The operator manipulates a forward/reverse lever 50, and a forward actuation valve 42 or a reverse actuation valve 46 is operated depending on a signal generated when the forward/reverse lever 50 is manipulated.

For example, when the forward actuation valve 42 is operated, the forklift moves forward as a forward gear 43 is rotated by a forward clutch 41 in the transmission 40. In addition, when the reverse actuation valve 46 is operated, the forklift moves rearward as a reverse gear 47 is rotated by a reverse clutch 45 in the transmission 40.

The transmission 40 may be provided as a hydraulic transmission, and the hydraulic transmission may include a drive shaft 30 which has an outer circumferential surface along which a first gear (not illustrated) and a second gear (not illustrated), which have different teeth and diameters, are provided, and a first piston (not illustrated) and a second piston (not illustrated) which are connected with a first flow path (not illustrated) and a second flow path (not illustrated) provided in the drive shaft 30.

In addition, a spring (not illustrated) is provided at one side of the first piston and the second piston to press the pistons in predetermined directions. That is, the spring allows the first piston and a left clutch pack to be spaced apart from each other, and allows the second piston and a right clutch pack to be spaced apart from each other.

Therefore, when hydraulic oil does not flow into the first flow path and the second flow path, the first piston and the second piston do not press the left clutch pack and the right clutch pack, respectively, and as a result, a clutch disk (not illustrated) and a friction member (not illustrated) do not come into contact with each other, such that power is not transmitted to the first gear and the second gear. Based on this principle, a gear shift operation for the forklift is carried out by the transmission 40, or traveling of the forklift, that is, forward traveling or reverse traveling is controlled.

The forklift according to the exemplary embodiment of the present disclosure, which includes the transmission 40, the engine 11, and the drive wheels 10 and travels as described above, further includes a stopping unit that includes a controller 80, a brake pedal detecting means 70, and a seated operator detecting means 60. In addition, the stopping unit may further include an information storage medium that stores information.

The brake pedal detecting means 70 is a means for detecting whether a brake pedal of the forklift is operated, and may detect whether the brake pedal is turned on or off based on an electrical signal, or may detect whether the brake pedal is operated by measuring a movement angle of the brake pedal.

The brake pedal detecting means 70 may be mounted to the brake pedal at the operator's seat in the forklift, or may be mounted to the drive shaft 20 of the transmission 40 or the drive wheels 10 in some cases.

The seated operator detecting means 60 is a means for detecting whether the operator is seated in an operator's seat in the forklift, and may be implemented as a pressure sensor that is provided in the operator's seat and senses a predetermined amount of pressure to detect whether the operator is present, or may be implemented as a sensor for sensing a temperature in the operator's cab. That is, whether the operator is present may be detected not only by a method of measuring pressure of the operator's seat, but also by using a device such as a device for sensing a temperature in the operator's cab or a switch for checking additional motion.

The brake pedal detecting means 70 and the seated operator detecting means 60 convert the measured information into electrical signals and transmit the electrical signals to the controller 80. In addition, the signals transmitted to the controller 80 may be stored in the information storage medium.

The controller 80 analyzes the obtained information, compares the analyzed information with predetermined data or reference values, determines whether the brake pedal is operated and whether the operator is seated in the operator's seat, and then controls the forward actuation valve 42 or the reverse actuation valve 46.

An operating principle of the automatic stopping device for a forklift according to the exemplary embodiment of the present disclosure will be described below. First, when the operator moves away from the operator's seat as necessary while the operator starts the engine of the forklift and drives or operates the forklift at normal times, the seated operator detecting means 60 obtains information about the absence of the operator, and transmits a signal to the controller 80.

The controller 80, which has received the signal regarding the information about the absence of the operator, recognizes that the operator is not seated in the operator's seat in a state in which the engine of the forklift is turned on, and operates both of the forward actuation valve 42 and the reverse actuation valve 46.

When the controller 80 obtains the signal regarding the absence of the operator from the seated operator detecting means 60, the controller 80 may operate the forward actuation valve 42 and the reverse actuation valve 46 after a first standby time t1. This is because in a case in which the operator is seated back in the operator's seat within the first standby time t1, it is not necessary to operate the automatic stopping device.

In order to determine whether the operator is present depending on the amount of time for which the operator is not seated in the operator's seat, the forward actuation valve 42 and the reverse actuation valve 46 are not operated immediately after the seated operator detecting means 60 obtains the information about the absence of the operator, but are operated after a marginal time, that is, the first standby time t1.

To this end, the first standby time t1, which is preset in the controller 80, may be set to one to three seconds, and the first standby time t1 may be variously set depending on the type of forklift, a working environment, the type of work, and characteristics of the operator.

The reason why the marginal time is set as described above is to prevent displeasure which the operator may feel when there occurs forcible stopping of the forklift that the operator does not intend, and to minimize loads caused by a change in working situation while the forklift is being operated.

When the signal regarding the absence of the operator has been obtained from the seated operator detecting means 60 and the time t1 has passed, both of the forward actuation valve 42 and the reverse actuation valve 46 are opened, and the hydraulic oil flows in along the flow path in the drive shaft 30 such that both of the forward clutch pack and the reverse clutch pack are operated. As a result, both of the forward gear 43 and the reverse gear 47 are rotated by the operations of the forward clutch 41 and the reverse clutch 45, such that the forklift is stopped as power from the engine 11 is transmitted in both of the forward direction and the reverse direction.

The information about the absence of the operator is obtained by the seated operator detecting means 60, the obtained information is input to the controller 80, and as a result, the forward gear 43 and the reverse gear 47 are operated at the same time, such that the forklift is automatically and forcibly stopped.

Thereafter, when the operator returns back to the operator's seat and is seated in the operator's seat in the forklift, the operator releases the automatic stopping device according to the exemplary embodiment of the present disclosure by operating the brake pedal.

That is, when the brake pedal is operated while the brake pedal detecting means 70 connected to the brake pedal detects whether the brake pedal is operated, the brake pedal detecting means 70 sends a signal to the controller 80 in order to stop the operations of the forward actuation valve 42 and the reverse actuation valve 46 such that the stopping device is released. Therefore, the brake pedal serves as a device for releasing the automatic stopping device for the forklift according to the exemplary embodiment of the present disclosure.

In this case, when the operator is seated in the operator's seat, the seated operator detecting means 60 obtains information about whether the operator is seated in the operator's seat, and transmits the information to the controller 80. However, the operations of the forward actuation valve 42 and the reverse actuation valve 46 are not immediately stopped, but are stopped after a marginal time, that is, a second standby time t2.

The second standby time t2 also serves to perform the same function as the aforementioned first standby time t1, and allows the operator to predict whether the forklift inadvertently begins to travel or whether the forklift inadvertently stops traveling, and controls the forklift so that the forklift begins to travel or stops traveling depending on the operator's intention.

The operations of the forward actuation valve 42 and the reverse actuation valve 46 are not stopped only by the information that the operator is seated in the operator's seat, and only when a signal for operating the brake pedal is received from the brake pedal detecting means 70 after the second standby time t2, the operations of the forward actuation valve 42 and the reverse actuation valve 46 are stopped.

Like the first standby time, the second standby time t2 may be set to one to five seconds, and may be variously set depending on the type of forklift, a working situation, and characteristics of the operator. In addition, since the second standby time t2 is a marginal time between when the operator is seated and when the brake pedal is operated, the second standby time t2 may be set to be longer than the first standby time t1.

When the operator operates the brake pedal to release the automatic stopping device for a forklift according to the exemplary embodiment of the present disclosure, the forklift is restored to an original driving state so as to move forward and rearward and operate the working machines in accordance with the operator's work.

In addition, the controller 80 may collect and analyze information about a gear selection signal, an accelerator pedal signal, and a speed signal. That is, the controller 80 determines a direction in which the forklift currently moves (the forward direction or the reverse direction), and checks whether the accelerator pedal is operated, thereby determining the intention of the operator.

In addition, the controller 80 may further include an information recording device so as to store data depending on characteristics of the operator, and determine time for which the forklift works and time for which the operator is absent, based on the stored data as necessary.

The present disclosure is not limited to the above specific preferred exemplary embodiment, the exemplary embodiment may be variously modified by those skilled in the art to which the present disclosure pertains without departing from the subject matters of the present disclosure claimed in the claims, and the modifications belong to the scope disclosed in the claims.

The exemplary embodiment of the present disclosure may be applied to the automatic stopping device for a forklift which forcibly stops the forklift when the operator moves away from the forklift.

What is claimed is:

1. An automatic stopping device for a forklift, comprising:
a forward/reverse lever of the forklift which is manipulated by an operator;
a forward actuation valve and a reverse actuation valve which are operated by the forward/reverse lever;
a transmission which is provided between an engine and drive wheels and performs a gear shift operation by an operation of the forward actuation valve or the reverse actuation valve; and
a stopping unit which forcibly stops the forklift depending on whether the operator is present,
wherein the stopping unit includes:
a seated operator detector which detects whether the operator is seated in an operator's seat;
a brake pedal detector which detects whether a brake pedal is operated; and
a controller which obtains signals from the seated operator detector and the brake pedal detector and controls the forward actuation valve and the reverse actuation valve; and
wherein, when the controller obtains the signal regarding an absence of the operator from the seated operator detector, the controller operates the forward actuation valve and the reverse actuation valve after a first standby time, and
wherein, when the controller obtains information indicating that the operator is seated in the operator's seat from the seated operator detector, and obtains a signal for operating the brake pedal received from the brake pedal detector after a second standby time, the controller stops the forward actuation valve and the reverse actuation valve.

2. The automatic stopping device of claim 1, wherein the seated operator detector is provided as a pressure sensor mounted in the operator's seat.

3. The automatic stopping device of claim 1, wherein the controller compares the signals received from the seated operator detector and the brake pedal detector with respective predetermined values, and operates the forward actuation valve and the reverse actuation valve of the transmission depending on compared information.

4. The automatic stopping device of claim 1, wherein the brake pedal detector detects an electrical contact of the brake pedal or detects an operating angle of the brake pedal.

5. The automatic stopping device of claim 1, wherein when the brake pedal detector detects the brake pedal is operated, all signals transmitted from the controller to the forward actuation valve and the reverse actuation valve are released.

* * * * *